United States Patent [19]

Fox et al.

[11] 4,205,379
[45] May 27, 1980

[54] POSITION DETERMINING AND DYNAMIC POSITIONING METHOD AND SYSTEM FOR FLOATING MARINE WELL DRILL PLATFORMS AND THE LIKE

[75] Inventors: Marvin Fox; Donald L. Cooper, both of Houston; Walter B. Warren, Seabrook, all of Tex.

[73] Assignee: TRW Inc., Systems & Energy, Redondo Beach, Calif.

[21] Appl. No.: 904,359

[22] Filed: May 9, 1978

Related U.S. Application Data

[63] Continuation-in-part of Ser. No. 796,944, May 16, 1977, abandoned.

[51] Int. Cl.² ............... G06F 15/20; B63H 15/00
[52] U.S. Cl. ..................... 364/432; 114/144 B; 364/449
[58] Field of Search ............... 364/432, 449, 559, 560, 364/600, 602; 114/144 B, 144 R, 144 E, 264, 293, 294, 311, 270; 33/1 R, 1 N, 1 PT, 302, 303, 313, 340, 341, 351, 354; 340/4 R, 4 B, 6 R, 7 R, 7 PC, 24, 29, 18; 318/588, 489; 175/1, 5, 7; 73/151

[56] References Cited

U.S. PATENT DOCUMENTS

| 3,148,653 | 9/1964 | Shatto, Jr. et al. ............... 364/432 X |
| 3,422,783 | 1/1969 | Moulin ............................... 114/144 B |
| 3,880,105 | 4/1975 | Bryant ............................... 114/264 X |
| 3,953,827 | 4/1976 | Le Moal et al. .................. 340/7 R |
| 4,044,473 | 8/1977 | Crask ................................. 33/1 N X |

Primary Examiner—Joseph F. Ruggiero
Attorney, Agent, or Firm—John J. Connors; Donald R. Nyhagen

[57] ABSTRACT

The relative horizontal positions of a floating marine platform and the lower end of a flexible connecting line, such as a cable, drill string, or well bore riser, suspended from the platform are determined by generating angle signals representing the instantaneous vertical slope angles of the connecting line at or near its upper and lower ends, filtering these signals to remove higher order frequencies resulting from variable forcing functions, such as surface wave induced motion of the platform, which produce no net change in the platform position, whereby the filtered angle signals represent the mean terminal slope angles of the envelope of the undulating connecting line, and combining these filtered angle signals in accordance with a predetermined position equation which compensates for phase lag between the sensor measured and true positions of the platform due to the transit time of platform motion induced stress waves or undulations along the connecting line to the lower angle sensor. The invention is described in the context of positioning a floating oil well drilling or producing platform relative to an ocean floor well head.

18 Claims, 6 Drawing Figures

POSITION DETERMINING AND DYNAMIC POSITIONING METHOD AND SYSTEM FOR FLOATING MARINE WELL DRILL PLATFORMS AND THE LIKE

CROSS-REFERENCE TO RELATED APPLICATIONS

This application is a continuation-in-part of copending application Ser. No. 796,944, entitled "Position Computing and Dynamic Positioning Method and System and the Like", filed on May 16, 1977, now abandoned.

BACKGROUND OF THE INVENTION

The ever increasing rate of petroleum consumption coupled with the current price demands of the primary oil producing countries has created the necessity of offshore oil and gas well drilling and producing operations in water of ever increasing depth and a resulting marine platform positioning or station keeping problem of ever increasing complexity and difficulty. In this latter regard, it is known that offshore oil and gas well drilling and producing operations in relatively shallow water, up to a depth of 2000 feet, for example, may be performed from a fixed tower-like structure which rests directly on and is firmly anchored directly to the ocean floor. At greater depths, floating platforms must be employed for such operations. These platforms must somehow be retained in a relatively fixed position over the well bore being drilled into or the well head on the ocean floor.

A floating oil well drilling installation, for example, has a floating drilling platform and a drill string extending from the platform to the ocean floor which is driven in rotation from the platform to drill a well bore into the floor. A floating oil or gas producing installation has a riser extending from the floating platform to the well head on the ocean floor and pumping means on the platform for pumping oil upwardly through the riser. The drill string and casing or riser, as the case may be, is thus fixed at its lower end, while its upper end moves horizontally and vertically with the floating platform. Floating at the water surface as it does, the platform is subject to displacement from its optimum position over the well bore or well head by wind, wave, and/or ocean current action. Accordingly, platform positioning or station keeping means must be provided for retaining the platform in position against the action of such forces.

Two general types of platform positioning techniques, one passive and the other dynamic, have been devised for this purpose. The passive platform positioning technique involves simply anchoring or tethering the platform in a fixed position with cables extending from the platform to anchors fixed to the ocean floor. The dynamic platform positioning technique involves sensing departure of the floating platform from its optimum position and continuously driving the platform back toward such position. The present invention is concerned with a dynamic platform positioning technique.

A wide variety of dynamic platform positioning techniques have been devised. A few of these are described in the following patents:

| | |
|---|---|
| 3,121,954 | 3,508,512 |
| 3,148,653 | 3,588,796 |
| 3,187,704 | 3,730,126 |
| 3,191,570 | 3,886,887 |
| 3,311,079 | 3,948,201 |
| 3,369,516 | |

The dynamic platform positioning techniques described in many of these patents involve sensing and generating signals representing, in terms of a selected coordinate system, the angle of a connecting line extending from the platform to a fixed reference position on the ocean floor, and controlling a platform propulsion system in response to these signals in such a way as to maintain the platform in a desired horizontal position relative to the reference. The connecting line is a cable in U.S. Pat. No. 3,187,704, and a casing or drill string in U.S. Pat. No. 3,191,570. U.S. Pat. No. 3,148,653 shows two connecting lines, one a cable and one a drill string.

The prior art dynamic floating platform positioning systems which utilize such a connecting line suffer from two major deficiencies which this invention overcomes. The first deficiency resides in the fact that these platform positioning systems assume the connecting line to be essentially linear along its full length from the floating platform to the ocean and rely on an angle measurement of one end only of the connecting line. In some cases, this angle measurement is made at the floating platform as in U.S. Pat. No. 3,121,954 and in other cases, at the ocean floor as in U.S. Pat. No. 3,191,570. U.S. Pat. No. 3,148,653, which employs two separate connecting lines, i.e., a cable and a drill string, makes the cable angle measurement at the platform and the drill string angle measurement at the ocean floor.

In actual practice, however, the connecting line becomes increasingly more nonlinear and its nonlinearity becomes more time variable as the water depth increases due to several factors, such as surface wave induced platform motion which produces traveling stress waves or undulations in the connecting line, ocean currents, the weight of the connecting line itself, changing connecting line tension and the like.

The second deficiency is related to the phase lag which exists between true platform position and sensor measured platform position, particularly at depths exceeding approximately 2500 feet, when the bottom angle of the connecting line is used for position determination. This phase lag is due to the transit time required for platform motion induced stress waves or undulations to propagate downwardly through the connecting line to the bottom angle sensor. When a position measuring system which introduces such phase lag is incorporated into a closed loop dynamic positioning system, the stability of the closed loop system is degraded, and in some instances, may become completely unstable.

As a consequence of the foregoing and other deficiencies, the existing dynamic floating platform positioning systems of the character described are useful only in relatively shallow water up to depths on the order of 2500 feet. On the other hand, present and near future offshore oil operations contemplate accurate marine platform positioning in water up to depths of 6000 feet and more. Accordingly, there is a need for an improved dynamic marine platform positioning or station keeping system.

SUMMARY OF THE INVENTION

According to one of its aspects, this invention provides a novel method and system for determining the relative horizontal positions of a floating marine platform and lower end of a submerged flexible line, referred to herein as a connecting line, extending from the platform to the ocean floor. This suspended line may be a cable for anchoring the platform to the ocean floor, a drill string for drilling a well bore into the ocean floor or a riser for attachment to an ocean floor well head. Another aspect of the invention is concerned with a dynamic floating platform positioning or station keeping method and system which utilize the position determining technique of the invention to maintain a floating platform in a desired position relative to a reference point on the ocean floor. The invention is particularly adapted for use in relatively deep water, on the order of 6000 feet or more, for example, where surface wave induced motion of the floating platform and other fluctuating forces produce traveling undulations in the connecting line.

The present position determining invention involves sensing and producing angle signals containing information representing the vertical slope angles of the submerged connecting line at or near its upper and lower ends and, if necessary for position determination, also azimuth information defining the azimuthal angle or direction of the connecting line relative to a selected azimuth reference. These angle signals are filtered to eliminate higher order frequency components produced by surface wave induced connecting line undulations and the like, whereby the filtered angle signals represent, in effect, the mean vertical slope angles of the connecting line ends, i.e., the upper and lower vertical slope angles of the envelope of the undulating connecting line. The filtered signals are combined in predetermined relationship with signals representing selected connecting line, platform, and marine parameters, referred to collectively as basic system parameters, to produce an output representing the relative horizontal positions of the upper and lower connecting line ends. Assuming the connecting line is anchored to the ocean floor, this output represents the horizontal position of the platform relative to the ocean floor anchor point of the connecting line.

The present platform positioning or station keeping invention embodies the position determining system and a platform propulsion system for maintaining a floating platform in a predetermined horizontal position relative to a selected ocean floor reference point. According to this aspect of the invention, the connecting line is anchored to the ocean floor, and the output from the position determining system is utilized to control the platform propulsion system in such a way as to maintain the platform in the desired position.

In some applications, the basic system parameters may remain sufficiently constant during any given operating period to enable the same parameter values to be used during the entire operating period. In other applications, at least some of these parameters may be subject to change. The invention contemplates sensing such changeable parameters and updating their values as required.

DESCRIPTION OF THE PREFERRED EMBODIMENT

Figure 1:
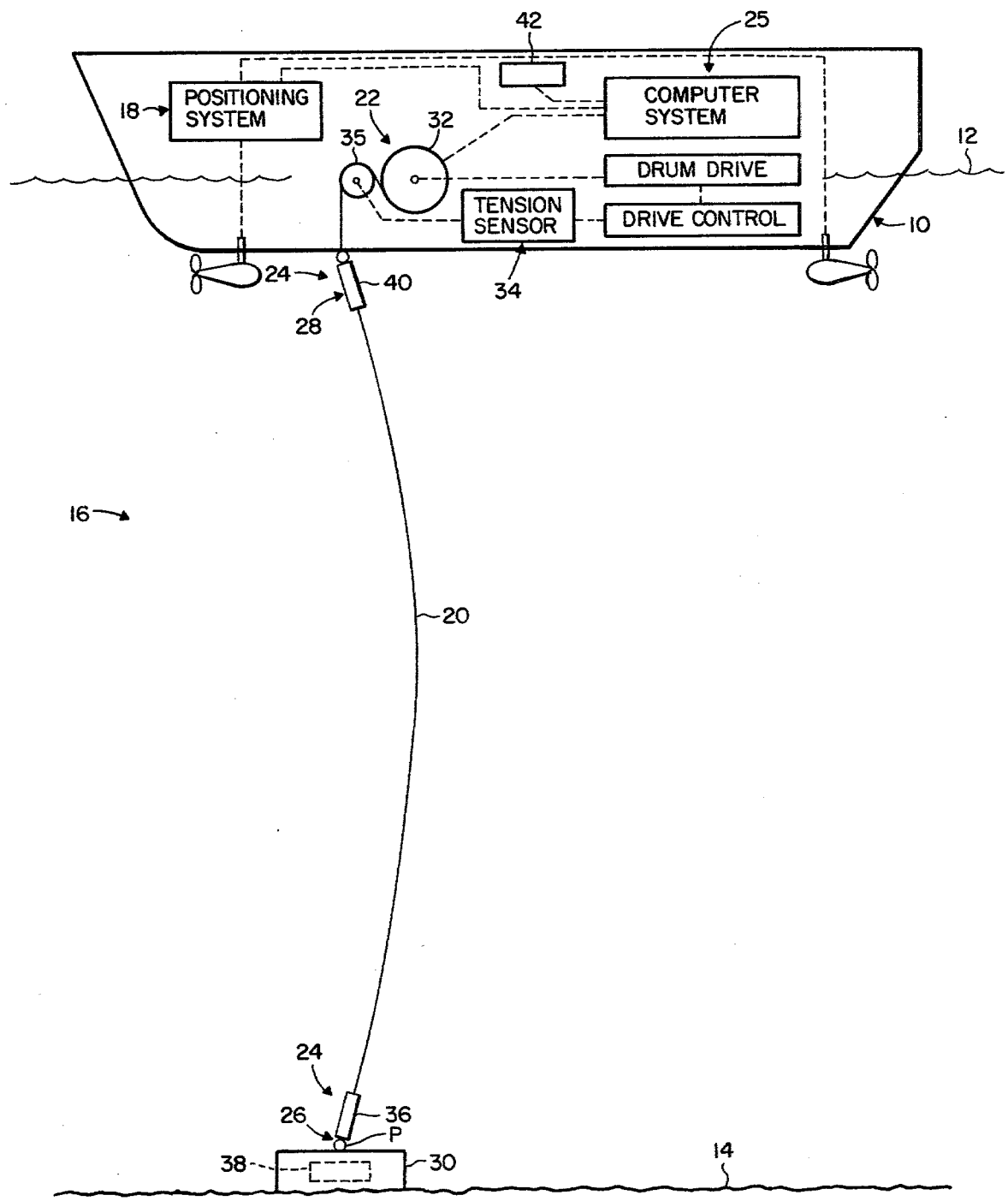
FIG. 1 diagrammatically illustrates a marine platform positioning system according to the invention.
Figure 2:
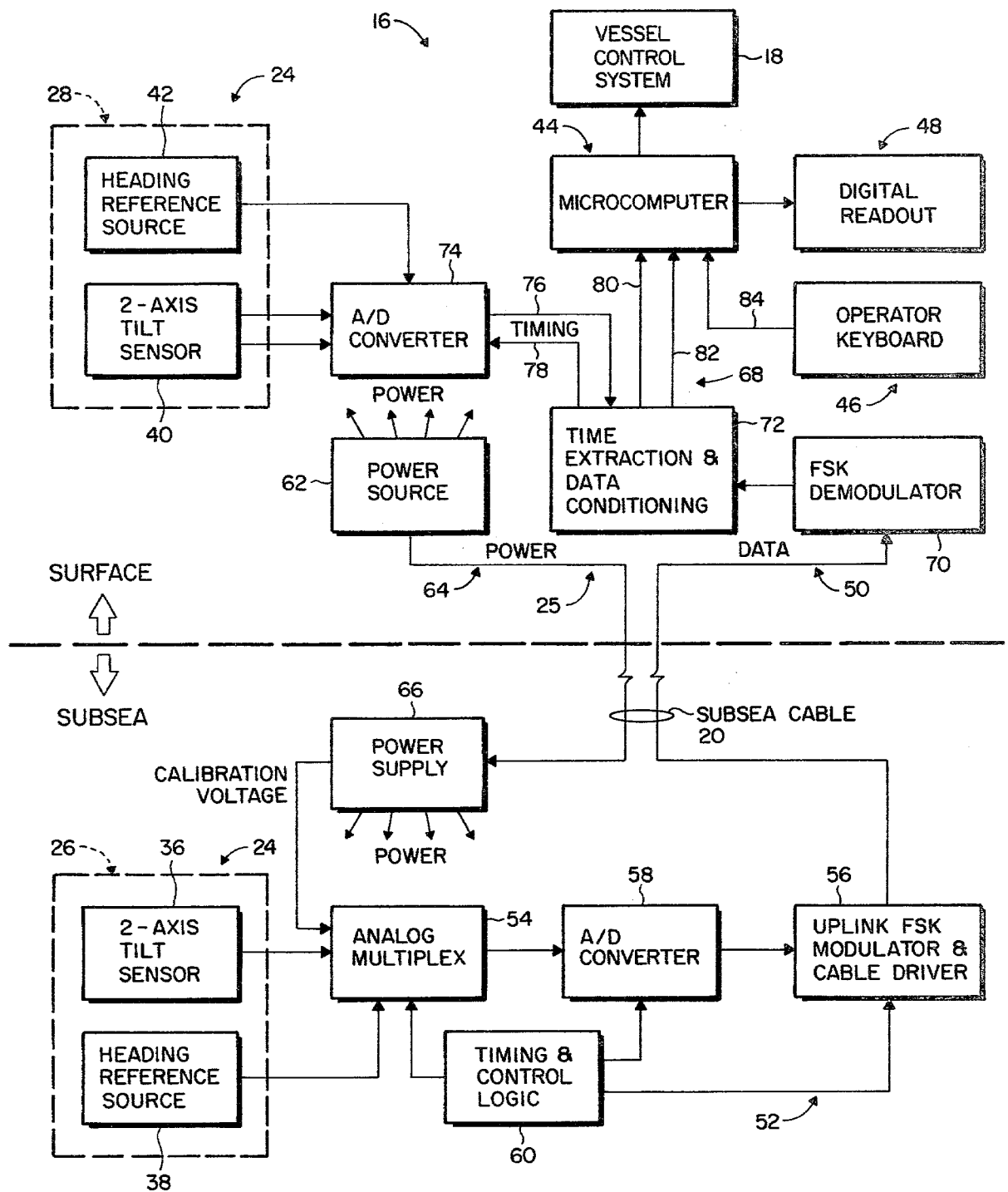
FIG. 2 is a schematic circuit diagram of the system.

Turning first to FIG. 1, reference numeral 10 denotes a marine platform floating at the surface of a body of water 12, such as the ocean, and required to be maintained in a predetermined horizontal position relative to a reference P on the ocean floor 14. Platform 10 is equipped with a position determining system 16 according to this invention for producing a position signal representing the horizontal position of the platform relative to the ocean floor reference P and with a dynamic platform positioning or station keeping system 18 controlled by this position signal for maintaining the floating platform 10 in the desired position relative to the ocean floor reference.

In general terms, the floating platform position determining system comprises a flexible connecting line 20 extending from the floating platform 10 to the ocean floor 14, means 22 for sensing and regulating the tension in this connecting line, means 24 for sensing and producing angle signals representing, in terms of a selected coordinate system, the vertical slope and horizontal azimuth angles of the connecting line 20 at or near its upper and lower ends, and in some cases also the rates of change of these angles, and signal processing means 25 for combining these angle signals in accordance with a position equation relating the connecting line angles and selected system parameters, including connecting line, platform, and ocean parameters, to provide a position signal output representing the horizontal position of the marine structure 10 relative to the ocean floor reference P. This equation corrects or compensates for phase lag between true platform position and sensor measured platform position due to the propagation time of platform motion induced stresses along the connecting line. Signal processing means 25 filters the angle signals from the connecting line angle sensors to remove higher order signal frequencies resulting from surface wave induced undulations in the connecting line. The system operation occurs in a manner such that the platform position determination is based on a relatively closed approximation of the mean nonlinear path or envelope of the connecting line 20. As a consequence, the position determining system 16 provides an output which represents, with a relatively high degree of accuracy even in relatively deep water on the order of 6000 feet or more, the horizontal position of the platform relative to the ocean floor reference.

As mentioned earlier, and will become readily evident as the description proceeds, the connecting line 20 may be a cable, an oil well drill string, a casing string or riser or the like. In the following description, it will be assumed that the lower end of the connecting line 20 is anchored to the ocean floor 14 at the ocean floor reference P. It should be understood, however, that the concepts and implementation of the present invention are equally applicable to determining the relative position of the upper and lower ends of a line or riser which is not attached to the sea floor.

As noted earlier, it is the practice of the invention to measure and use in the computation of the horizontal position of the platform 10, the vertical slope angles at or near both ends of the connecting line 20. To this end, the angle signal producing means 24 includes angle sensing means 26, 28 at or near both the lower and upper ends of the connecting line.

It will be recognized that the horizontal position of the platform 10 relative to ocean floor reference P may be measured and expressed in terms of any suitable coordinate system. In this disclosure, the platform position is measured and expressed in terms of a Cartesian coordinate system whose Z axis is vertical and passes through the reference P and whose X and Y axes are horizontal in the east/west and north/south directions, respectively. The lower connecting line end angle sensing means 26 produces an output representative of the vertical slope angle of a tangent to the lower connecting line end, measured in the X-Z plane, and in the Y-Z plane, respectively. These two slope angles obviously define both the true vertical slope of the lower connecting line, that is, the angle between the Z axis and a tangent to the lower portion of the connecting line measured in the plane containing the latter axis and tangent, and the azimuth angle of the lower end, that is, the angle between the latter plane and a selected datum plane, such as the X-Z plane. The upper angle sensing means 28 produces an output representing the vertical slope angle of a tangent to the upper end of the connecting line measured in two vertical, mutually perpendicular planes of the platform 10 parallel to the X-Z and Y-Z planes, respectively. These slope angles define both the true vertical slope angle and azimuth angle of the upper connecting line end. As will be explained later, in some applications, the angle sensing means 26, 28 may also sense and produce signals representing the rates of change of the connecting line slope angles.

At this point, it is significant to recall from the earlier discussion that the existing dynamic floating platform positioning systems of the general class to which this invention pertains are deficient for the reason that they ignore phase lag in the systems and assume the connecting line 20 to be linear from the floating platform 10 to the ocean floor 14. In actuality, however, a significant phase lag exists between the lower angle sensor output and the actual platform position. This phase lag increases with water depth and results from the transit time required for stress waves or lateral deformations produced in the upper end of the connecting line by wave induced and other movements of the platform to propagate downwardly through the connecting line to and be reflected in a corresponding change in the slope/azimuth angle output of the lower connecting line angle sensor 26. Also, the connecting line deviates substantially from a linear condition due both to relatively static forces, such as gravitational and ocean current forces which tend to cause the connecting line to become curved and to dynamic forces such as wave induced motion of the floating platform which cause traveling deformations or undulations in the connecting line. Such system phase lag and connecting line nonlinearity increases with the water depth and are dependent on various other factors, such as the physical characteristics, i.e., stiffness, weight per unit length, etc., of the connecting line, the tension in the line and the characteristics of the floating platform. Since such phase lag and connecting line nonlinearity increase with depth and are not taken into account in or factored into the platform position determination made by the existing dynamic platform positioning systems, these existing systems are limited in use to the relatively shallow water depths mentioned earlier.

In contrast, in the present invention, system phase lag and connecting line nonlinearity are corrected for or factored into the platform position determination in a manner which yields a relatively accurate determination or measurement of the position of platform 10 relative to the ocean floor reference P, even in water depths on the order of 6000 feet or more. To this end, the platform position determination involved in the present invention is based on a platform position equation which may be stated in simple terms as follows:

$$A, B = f(a, b, a', b', K) \quad (1)$$

where:
- A, B are coordinates representing the horizontal position of the platform relative to the datum position, in terms of a selected coordinate system.
- a, b, a', b' are the vertical slope and horizontal azimuth angles, respectively, in terms of the selected coordinate system, of the connecting line 20 at or near its upper and lower ends, respectively,
- K is a factor representing, collectively, a number of system parameters such as connecting line tension, weight per unit length, moment of inertia, and stiffness or modulus or elasticity, water depth, ocean current direction and magnitude, sea spectrum, etc., and
- f is a functional relationship of the quantities a, b, a', b' and K which effectively provides platform position coordinate values A, B based on a relatively close approximation of the system phase lag and true curvature of the connecting line.

The invention contemplates within its scope any functional relationship f of the quantities a, b, a', b', K which will yield a platform position determination or measurement of sufficient accuracy for the particular application at hand and utilization of any suitable coordinate system as a frame of reference for the position determination. The platform position equations (2), (3) set forth below define a presently preferred relationship f for use in practicing the invention. This relationship i.e., the platform position equations, are based on the Cartesian coordinate system depicted in FIGS. 4 and 5.

Figure 4:
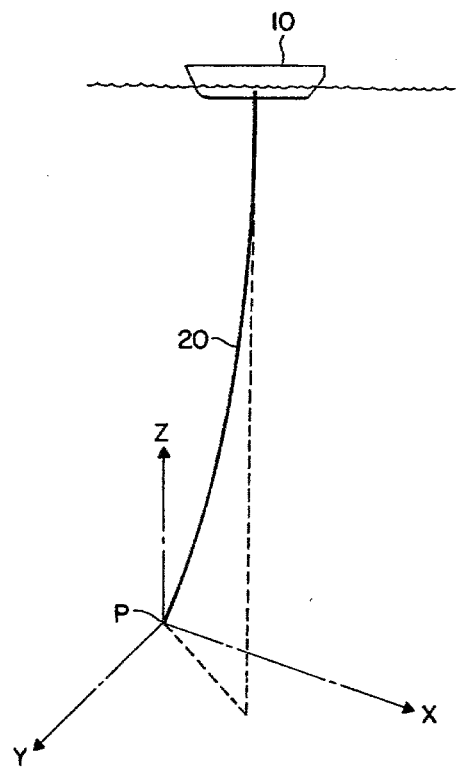
FIGS. 4 and 5 are diagrams illustrating certain relationships involved in the derivation of a position equation for use in the invention.
Figure 5:
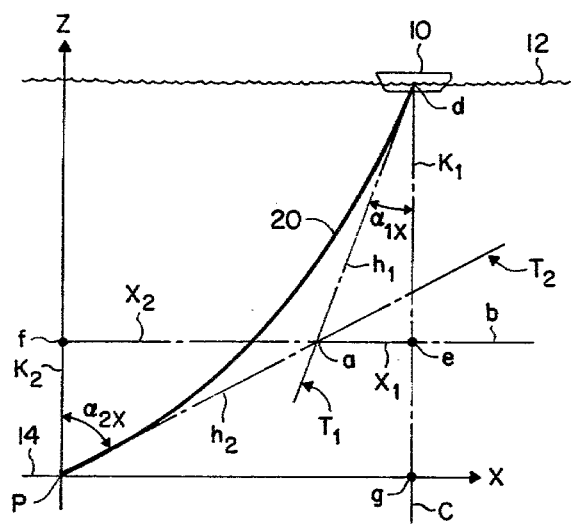

The manner in which the platform position equations (2) and (3) are derived will be explained in detail presently by reference to FIGS. 4 and 5. Suffice it to say at this point that the Cartesian coordinate system is represented in FIGS. 4 and 5 by the illustrated X, Y, Z axes whose origin is located at the ocean floor reference point P. The X and Y axes of this coordinate system are horizontal and aligned in selected directions, such as east/west and north/south directions, respectively. The Z axis is vertical and passes through the reference point.

The platform position equations are as follows:

$$X = K_1(a_x)_{TOP} + K_2(a_x)_{BOTTOM} \quad (2)$$

$$Y = K_1(a_y)_{TOP} + K_2(a_y)_{BOTTOM} \quad (3)$$

where:
- X, Y are the X and Y coordinates of the platform 10 in terms of the Cartesian coordinate system shown in FIGS. 4 and 5, $(\alpha_x)_{TOP}$, $(\alpha_y)_{TOP}$ are the vertical slope angles at or near the upper end of connecting line 20 measured in the X-Z and Y-Z planes, respectively, $(\alpha_x)_{BOTTOM}$, $(\alpha_y)_{BOTTOM}$ are the vertical slope angles at or near the lower connecting line end measured in the X-Z and Y-Z planes, respectively, and $K_1$, $K_2$ are averaging or gain factors which may be complex functions of frequency and/or include, collectively, a number of system parameters.

As explained in detail presently, the gain factors $K_1$, $K_2$ may be determined analytically or empirically and are selected to correct or compensate for the earlier mentioned phase lag in the position determining system, particularly in relatively deep water. Also, the angle signals from the sensors 26, 28, which represent the instantaneous values of the cable angles $(\alpha_x)_{TOP}$, $(\alpha_y)_{TOP}$, $(\alpha_x)_{BOTTOM}$, $(\alpha_y)_{BOTTOM}$, are filtered in the manner explained later to eliminate the higher frequency components produced by surface wave induced undulations in the cable 20. These filtered angle signals represent the mean vertical slope angles of the cable, or, stated another way, the vertical slope angles of the cable envelope, and are combined in accordance with the position equations (20), (3) to obtain the platform position.

The particular platform position determining system 16 illustrated in FIGS. 1-5 will now be described in detail. In this illustrated position determining system, the connecting line 20 is a cable which extends from the floating platform 10 to a base 30 firmly fixed to the ocean floor 14. The lower end of the cable if firmly anchored to this base in the manner explained below. The upper end of the cable is connected to the tensioning means 22 which is carried on the platform 10 and operates to maintain a relatively constant tension in the cable.

A variety of cable tensioning mechanism suitable for use in this invention are available. Accordingly, it is unnecessary to illustrate and describe the tensioning means in detail. For this reason, the tensioning means is shown in simple diagrammatic fashion to comprise a take-up drum 32 on which the upper end of cable 20 is wound and a cable tension sensing means 34 including a tension responsive roller 35 over which the cable passes to the drum. The takeup drum is motor-driven under the control of sensing means 34 and in response to the cable tension in such a way as to maintain a relatively constant predetermined tension in the cable.

The lower cable angle sensing means 26 comprises a pendulum-type two axis tilt sensor 36 which measures and produces output signals representing the vertical slope angle of the lower end of cable 20 in two fixed mutually perpendicular planes of the cable base 30 and a heading reference source 38 in the cable base 30 for measuring and producing a signal representing the horizontal heading of the base relative to the earth. It will be understood, therefore, that the output signals from the lower cable angle sensing means 26, i.e., tilt sensor 36 and reference source 38, provide the necessary information for computing the lower cable slope angles $(\alpha_x)_{BOTTOM}$, $(\alpha_y)_{BOTTOM}$ in the earlier stated platform position equations (2), (3). It is considered to be within the scope of the invention to initially install the base 30 on the ocean floor 14 with the slope measurement planes of the tilt sensor 36 precisely aligned with the X-Z and Y-Z planes of the coordinate system. In this case, the tilt sensor 36 will measure the lower cable slope angles $(\alpha_x)_{BOTTOM}$, $(\alpha_y)_{BOTTOM}$ directly, and the base reference source 38 may be eliminated, or at least not used for slope angle computation.

The tilt sensors in some applications may also produce output signals representing the rates of change of the cable end angles for use in the platform position computation performed by the position determining system 16. Two-axis accelerometers or tilt sensors suitable for use in the platform position determining system 16 are available from a number of market sources including the Schaevitz Co., Delco Corporation, Minneapolis Honeywell Co., and Litton Industries.

As noted earlier, the floating platform position determining system 16 embodies a signal processing means 25. This signal processing means receives the instantaneous cable angle signals from the cable end angle sensing means 26, 28, filters these signals to remove the higher order frequency components produced by wave induced undulations in the cable, and combines the filtered angle signals in accordance with the platform position equations (2), (3) to produce a platform position signal output representing the horizontal position of the marine platform 10 relative to the ocean floor reference P in terms of the Cartesian coordinate system employed. Signal processing means 25 comprises a computer 44 for performing the actual mathematical computations involved in the position equations (2), (3). The filtered angle signals from the angle sensing means 26, 28 are input to this computer along with cable, platform and ocean parameter data which is entered via an operator keyboard 46. The computer 44 outputs to a readout device 48 which may display the coordinates of the platform 10 and/or the input data from keyboard 46. Computer 44 also outputs to the platform positioning system 18 which operates to maintain the platform in a selected horizontal position relative to the ocean floor datum position P.

The lower cable end angle information from the lower cable end angle sensing means 26 is transmitted to the computer 44, which is located on the platform 10, through a signal transmission path 50 in the cable 20. It will be recognized by those versed in the art that a variety of signal transmission techniques may be employed to transmit the lower cable end angle information to the surface through the transmission path 50. The particular marine platform position determining system illustrated utilizes a frequency shift keying (FSK) signal transmission system 52 for this puspose.

FSK system 52 is conventional and comprises an analog multiplexer 54 to which are input the cable end angle and rate signals from the lower cable end two-axis tilt sensor 36 and the cable base heading signal from the lower cable base reference source 38. Multiplexer 54 outputs to an uplink FSK modulator and cable driver 56 through an analog to digital (A/D) converter 58. The timing and control function of the FSK system 52 is provided by a timing and control logic unit 60. Electrical power is provided to the lower cable end angle sensing means 26 and to the FSK system 52 from a power source 62 on the platform 10 through an electrical power transmission path 64 in the cable 20. This power source energizes a D.C. power supply 66 embodied in the FSK system 52 which supplies operating power to the latter system and a calibration voltage to the analog multiplexer 54. It will be understood, therefore, that the FSK system 52 converts the cable angle signals (including angle rate signals, if any) from the lower two-axis tilt sensor 36 and the cable base heading signal from the reference source 38 to multiplexed, digital FSK modulated signals containing lower cable end angle information, cable base heading information, and multiplex timing information.

The digital, multiplexed, FSK modulated signals from the FSK system 52 are transmitted as uplink signals through the uplink cable signal transmission path 50 to circuitry 68 of the floating platform 10. Input circuitry 68 includes an FSK demodulator 70 which receives and demodulates these uplink signals and outputs their contained digital signal information, i.e., lower cable end angle, cable base heading, and multiplex timing information to a timing extraction and data conditioning circuit 72. This timing extraction and data conditioning circuit also receives the cable end angle signals (including angle rate signals if any) from the upper cable two-axis tilt sensor 40 and the floating platform heading signal from the platform reference source 42 through an A/D converter 74 and a signal transmission path 76 and outputs timing information to the A/D converter 74 through a timing signal transmission path 78. Timing extraction and data conditioning circuit 72 comprises conventional signal conditioning circuitry which conditions its several input signals for proper operation in the computer 44. The conditioned upper and lower cable end angle signals and conditioned cable base and floating platform heading signals from conditioning circuit 72 are input to the computer 44 via a signal transmission path 80. Circuit 72 also inputs to the computer 44, via a signal transmission path 82, a data ready signal in response to receipt of signal information from the bottom and top cable angle sensors 36, 40 and the cable base and platform reference sources 38, 42. The operator keyboard 46 inputs to the computer 44 through a signal transmission path 84.

Figure 3:
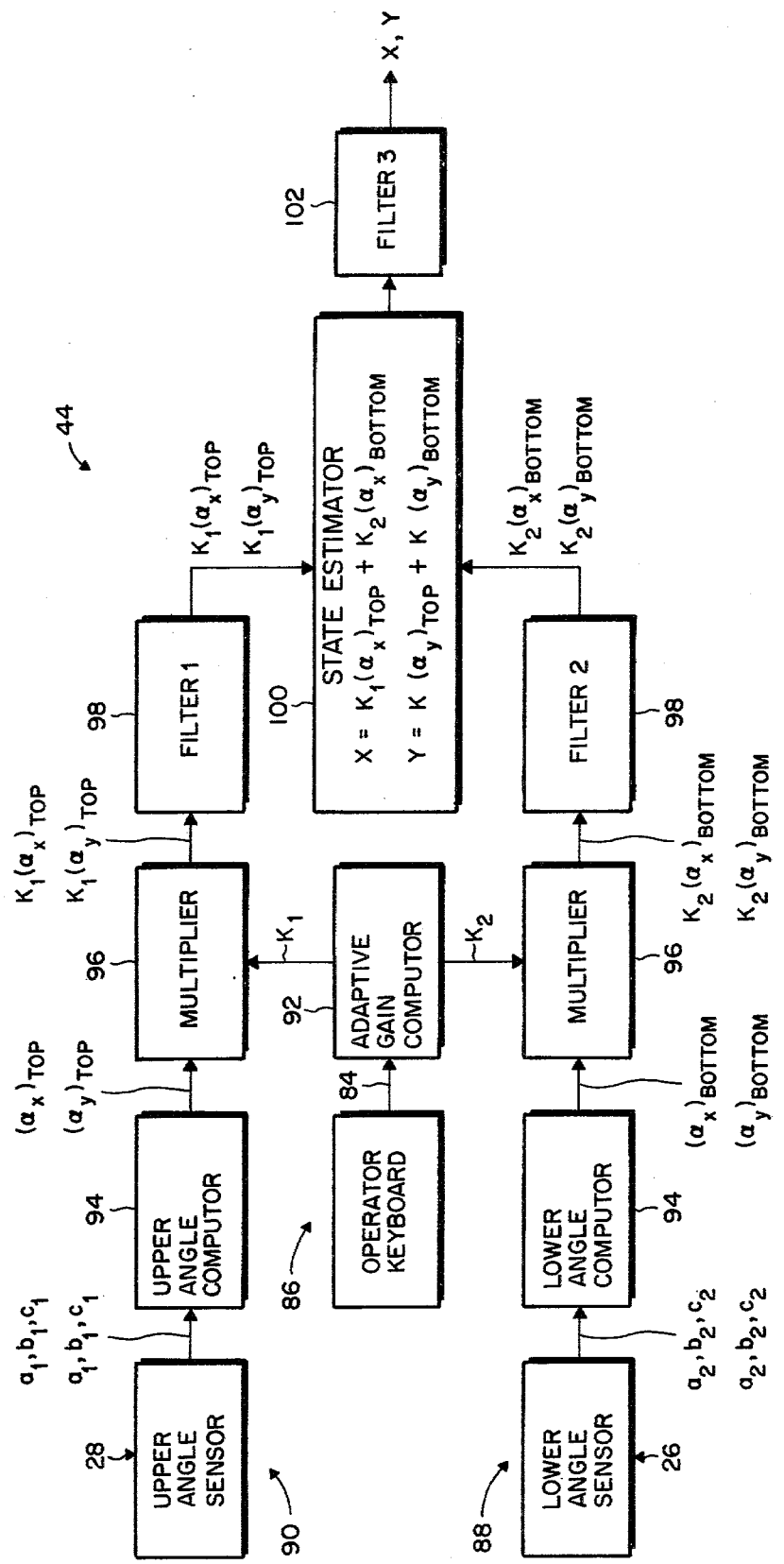
FIG. 3 diagrammatically illustrates the algorithm utilized in the invention.

Referring to FIG. 3, the computer 44 has three data input channels 86, 88, 90. Channel 86 is a system parameter input channel including a gain factor determination means 92 which will be explained presently. Suffice to say at this point that this gain factor determination means receives from the keyboard 46 through the signal path 84 system parameter data from which may be determined the gain factors $K_1$, $K_2$ in the earlier mentioned platform position equations (2), (3). The gain factor determination means processes this parameter data and outputs to the computer input channels 88, 90 signals representing gain factors $K_1$, $K_2$, respectively, corresponding to the input parameter data from the keyboard 46.

Computer input channels 88, 90 are bottom and top cable angle input channels, respectively. Each channel 88, 90 includes an initial cable angle computation circuit 94, a following multiplier circuit 96, and a final low pass filter circuit 98. The lower cable angle input channel 88 receives from the data conditioning circuit 72 via the signal transmission path 80 conditioned cable angle signals containing information representing the two mutually perpendicular cable angles measured by the top cable slope angle sensor 40 and the heading of the marine platform 10 measured by the platform reference source 42.

It will now be understood that the cable angle input channels 88, 90 of computer 44 receive information from which may be computed the vertical cable slope angles $(\alpha_x)_{BOTTOM}$, $(\alpha_y)_{BOTTOM}$, $(\alpha_x)_{TOP}$, respectively of the platform position equations (2), (3). The cable angle computation circuits 94 of the channels perform these computations. More specifically, the cable angle computation circuit 94 of the lower cable angle input channel 88 is programmed to compute the lower cable angles $(\alpha_x)_{BOTTOM}$, $(\alpha_y)_{BOTTOM}$. The upper channel cable angle computation circuit 94 is programmed to compute the upper cable angles $(\alpha_x)_{TOP}$, $(\alpha_y)_{TOP}$.

The computed bottom cable angles $(\alpha_x)_{BOTTOM}$, $(\alpha_y)_{BOTTOM}$ from the angle computation circuit 94 of the lower cable angle input channel 88 and the gain factor $K_2$ from the gain factor determination means 92 are both input to the multiplier circuit 96 of the lower channel. The output from this multiplier circuit are signals representing the products $K_2(\alpha_x)_{BOTTOM}$ and $K_2(\alpha_y)_{BOTTOM}$. Similarly, the computed top cable angles $(\alpha_x)_{TOP}$, $(\alpha_y)_{TOP}$ from the angle computation circuit 94 of the upper cable angle input channel 90 and the gain factor $K_1$ from the gain factor determination means 92 are both input to the multiplier circuit 96 of the upper channel. The outputs from this multiplier circuit are signals representing the products $K_1(\alpha_x)_{TOP}$, $K_1(\alpha_y)_{TOP}$.

The signal outputs from the channel multipliers 96 are fed to the low-pass filter circuits 98. As explained presently, these filter circuits filter out higher order frequencies present in the cable angle signals from the cable slope angle sensors 36, 40 due to wave induced motion of the floating platform 10 which produce travelling stress waves or undulations in the cable 20. The filtered outputs from the multiplier circuits 94, 96 represent products, not of the instantaneous cable slope angles $(\alpha_x)_{TOP}$, $(\alpha_y)_{TOP}$, $(\alpha_x)_{BOTTOM}$, $(\alpha_y)_{BOTTOM}$, but rather products of the mean cable slope angles, i.e. the top and bottom scope angles of the cable envelope.

These filtered output signals from the multipliers 94, 96 are input to a state estimator 100. This state estimator is a simple adder which sums the filtered signal products $K_1(\alpha_x)_{TOP}$, $K_1(\alpha_y)_{TOP}$, $K_2(\alpha_x)_{BOTTOM}$, $K_2(\alpha_y)_{BOTTOM}$ in accordance with the platform position equations (2), (3) to obtain the platform position coordinates X, Y. The state estimator output may be filtered at 102 to remove any remaining undesirable frequencies in the coordinate output signals.

Figure 6:
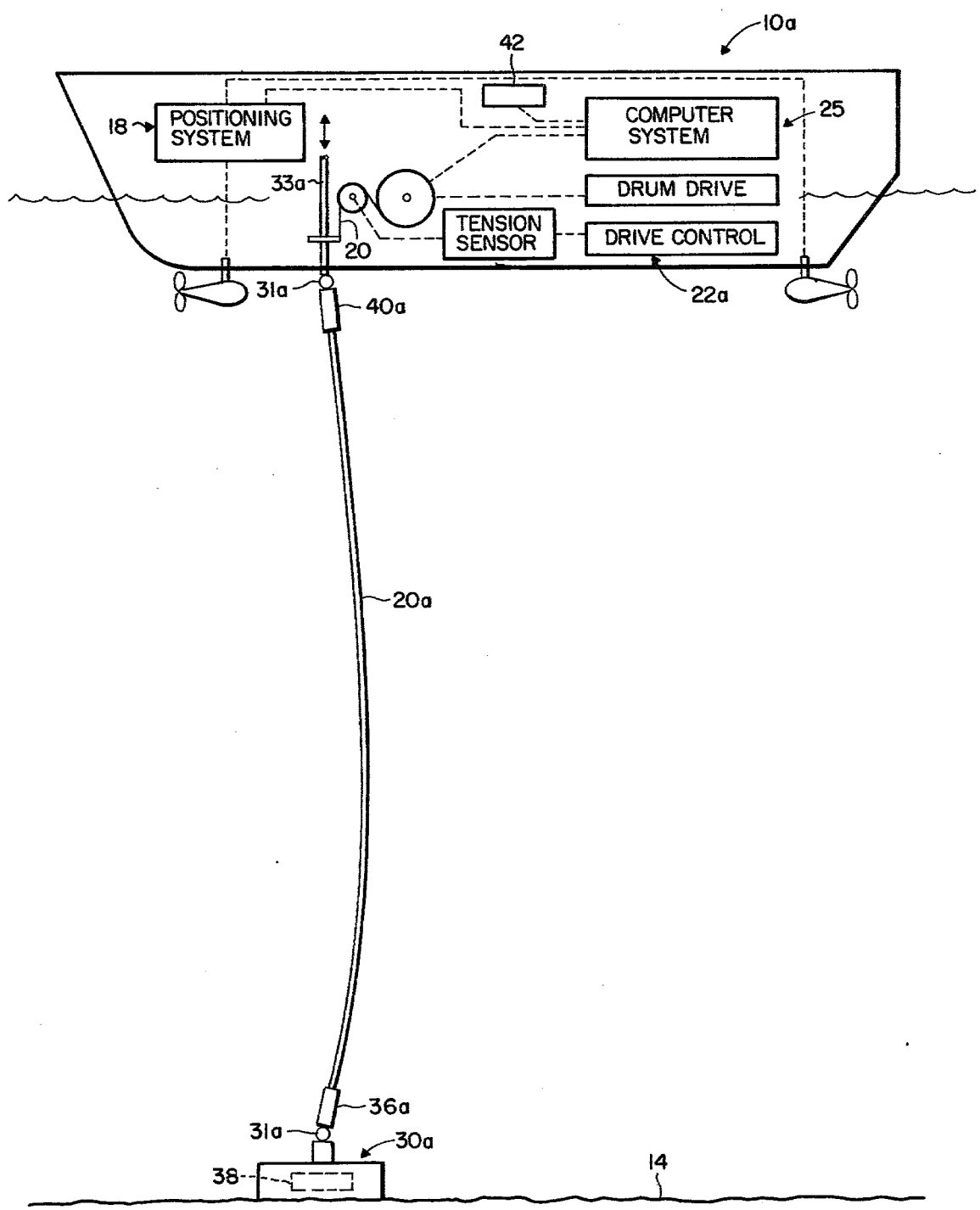
FIG. 6 is a view similar to FIG. 1 showing the use of a riser as the connecting line.

As noted earlier, the connecting line between the floating platform 10 and the ocean floor 14 may be other than a cable. In FIG. 6, for example, the platform 10a is an oil or gas well drilling or producing platform and the connecting line 20a is a riser extending from the platform to a well bore or head 30a on the ocean floor 14. In the case of a drilling platform, a drill string (not shown) extends through the riser. In the case of an oil production platform, oil is pumped to the surface through the riser. The lower end of the riser 30a is coupled to the well head by joint 31a which may be a ball joint. The upper end of the riser is coupled by a second joint 31a which may also be a ball joint to a vertically movable conduit 33a on the platform 10a communicating to an oil pump, gas pump, or drilling mud pump (not shown) on the platform. Conventional riser tensioning means 22a coupled to the conduit 33a, are provided for sensing and regulating the riser tension to maintain a relatively constant tension in the riser. This tensioning means, for example, may be a cable tensioning means similar to that of FIG. 1, wherein the cable 20 is attached to the conduit 33a to exert an upward pull on the riser 20a. Slope angle sensors 36a, 40a such as two-axis accelerometers or tilt-sensors similar to those used in FIG. 1, are mounted on the riser at or near its ends. The system shown in FIG. 6 is otherwise essentially identical to that of FIGS. 1-5.

The derivation of the position equations (2), (3) will now be explained by reference to FIGS. 4 and 5. FIG.

4 is a graphical representation, in perspective, of the floating marine platform 10, the ocean Reference P, the flexible connecting line or cable 20, and the Cartesian coordinate system X, Y, Z on which the position equations (2), (3) are based. FIG. 5 illustrates the projection of the platform 10 and cable 20 onto the X-Z plane of the coordinate system.

In FIG. 5, $T_1$ and $T_2$ are tangents to the upper and lower ends of the cable 20. These tangents intersect at a point a. A line b is drawn through this intersection point a parallel to the X axis and a line c is drawn through the upper point d of tangency of the cable 20 and tangent $T_1$, parallel to the Z axis. Lines b and c intersect one another at the point e and the Z and X axes, respectively, at points f and g. For all practical purposes, tangent point d is located at the ocean surface and intersection point g is located at the ocean floor 14.

It is evident from an inspection of FIG. 5 that the angle $\alpha_{1x}$ between the tangent $T_1$ and line c and the angle $\alpha_{2x}$ between the tangent $T_2$ and the Z axis define the upper and lower vertical slope angles of the cable 20, as measured in the X plane. It will also be seen that these slope angles are angles of right triangles a, d, e and a, f, p, respectively. For convenience, the sides of triangle a, d, e are designated $h_1$, $X_1$, $K_1$ and the sides of triangle a, f, p are designated $h_2$, $x_2$, $K_2$.

Based on simple trigonometry, it is apparent that $$\sin \alpha_{1x} = (X_1/h_1) \quad (4)$$

$$\sin \alpha_{2x} = (X_2/h_2) \quad (5)$$

For small slope angles on the order of 10° or less, the following approximations are valid:

$$K_1 = h_1;\ K_2 = h_2;\ \sin \alpha_{1x} = \alpha_{1x} \text{ (in radians)} \quad (6)$$
$$\text{and } \sin \alpha_{2x} = \alpha_{2x} \text{ (in radians)}$$

Rewritting equations (4) and (5) taking into account the approximations (6), we obtain:

$$\alpha_1 = X_1/K_1 \text{ or } X_1 = K_1\alpha_1 \quad (7)$$

$$\alpha_2 = X_2/K_2 \text{ or } X_2 = K_2\alpha_2 \quad (8)$$

The X coordinate of the platform 10 is:

$$X = X_1 + X_2 = K_1\alpha_{1x} + K_2\alpha_{2x} \quad (9)$$

It is evident that a similar analytical procedure based on the projection of the platform 10 and cable 20 onto the y plane of the coordinate system would yield the following equation:

$$Y = K_1\alpha_{1y} + K_2\alpha_{2y} \quad (10)$$

Where $K_1$ and $K_2$ are the same as in equation (9) and $\alpha_{1y}$, $\alpha_{2y}$ are the upper and lower vertical cable slope angles measured in the Y plane.

The above equations (9) and (10) are obviously the earlier position equations (2), (3) wherein the upper and lower cable slope angles are designated by the subscripts "top" and "bottom".

The procedure for determining the gain factors $K_1$, $K_2$ in the platform position equations (2), (3) will now be discussed. Assuming the physical characteristics of the connecting line 20, 20a to be such that the latter can be approximated by a uniform beam of negligible stiffness, i.e., negligible EI (Young's modulus x moment of inertia), the gain factors $K_1$, $K_2$ can be determined analytically as follows.

Consider first steady state conditions in which there are no waves or other variable forces acting on the platform 10, 10a or the connecting line 20, 20a and the connecting line tension is held constant. It can easily be demonstrated analytically that under these steady state conditions, the horizontal displacement (estimated) between the upper and lower ends of the connecting line may be expressed by the equations $$H = \alpha_B \left[ \frac{T_B \ln(T_T/T_B)}{T_T - T_B} \right] D = \alpha_T \left[ \frac{T_T \ln(T_T/T_B)}{T_T - T_B} \right] D \quad (11)$$

where
H = the horizontal displacement;
$T_B$ = bottom connecting line tension;
$T_T$ = top connecting line tension;
$\alpha_B$ = bottom connecting line slope angle;
$\alpha_T$ = top connecting line slope angle;
D = water depth.

The above equations (11) show that under the assumed steady state conditions, the horizontal displacement of the connecting line ends may be estimated or determined analytically using either the bottom or top connecting line slope angle alone.

An actual marine environment of the kind in which the invention is intended to be used is not a steady state environment, however, but rather a dynamic one in which the floating platform is subject to wave action. An important feature of this invention resides in the fact that it considers the dynamics of the platform system and marine environment and compensates or corrects for certain phase lag that such dynamics introduce into the system.

In this regard, consider an incremental horizontal motion of the floating platform 10, 10a due to wave action or maneuvering of the platform to return the latter toward a desired horizontal position relative to the ocean floor reference position P. This horizontal platform motion causes corresponding lateral motion of the upper end of the connecting line relative to its lower end and thereby also a change in the top and bottom slope angles of the connecting line. These slope angles, however, do not change instantaneously with and in direct relation to the motion of the upper connecting line end in a manner such that the instantaneous slope angles accurately reflect the current relative horizontal positions of the connecting line ends and hence the horizontal position of the floating platform relative to the ocean floor reference P. Rather, the platform motion produces stresses or stress waves which propagate along the connecting line in the form of travelling undulations in the line in much the same manner as travelling waves are produced in a long rope when one end of the rope is snapped. As a consequence, the platform motion is not reflected in a change in the bottom connecting line slop angle until the motion induced stress waves in the connecting line reach the lower slope angle sensor 36, 36a. Even then the lower connecting line end does not immediately assume a new steady state slope angle corresponding to the horozintal position of the platform at the end of the incremental platform motion which produced the slope angle change. Rather the bottom slope angle will fluctuate as the connecting line stress waves or undulations travel downwardly and then reflect upwardly past the bottom end slope angle sensor. The upper connecting line slope angle tends to change instantaneously with and in leading relation to platform motion. Slope angle fluctuations also occur at the upper end of the connecting line due to the travelling stress waves or undulations in the line.

It is evident from the foregoing discussion that in an actual dynamic marine environment in which the floating platform is subjected to wave action, the resulting wave induced motion of the platform produces complex stress waves or undulations in the connecting line which travel continuously back and forth along the line between the bottom and top slope angle sensors. The bottom and top connecting line slope angles, and hence also the slope angle outputs of the bottom and top slope angle sensors thus continuously fluctuate with a period or frequency related to the period of the surface waves about means values which are related to the current horizontal position of the platform relative to the ocean floor reference P and are effectively the slope angles of the envelope of the undulating connecting line. Further, owing to the transit time of the platform motion induced stress waves or undulations along the connecting line between the angle sensors, a phase lag exists between the output of the bottom slope angle sensor relative to that of the upper sensor.

As a consequence, in an actual marine platform installation according to the invention in which the dynamics of the platform system must be considered because of wave action, the slope angle outputs of the bottom and top slope angle sensors must be weighted to provide the proper phase relationship between sensor outputs. The gain factors $K_1$, $K_2$ in the position equations (2), (3) are scale factors which provide this weighting.

In order to analyze the phase characteristics of a given connecting line, the latter is modeled by a simple time delay $\tau$ representing the transit time of platform motion induced stress waves between the bottom and top slope angle sensors. The outputs of the top sensor 40 is assumed to be proportional to the velocity, i.e. rate of slope angle change, of the upper end of the connecting line. Under these conditions, it can be shown that:

$$K_1 = D \left[ \frac{1}{1 + \frac{T_B \cos \beta}{T_T \sin \omega \tau}} \right] \quad (12)$$

$$K_2 = D \left[ \frac{\frac{T_B \cos \beta}{T_T \sin \omega \tau}}{1 + \frac{T_B \cos \beta}{T_T \sin \omega \tau}} \right] \quad (13)$$

where
$\beta$ = time phase angle of the top connecting line slope angle $\alpha_T$ with respect to the platform velocity;
$\omega$ = angular frequency of platform oscillatory motion;
D, $T_T$, $T_B$ are as defined in equation (11).

For any given platform and connecting line configuration, the values of $\beta$, $\tau$, $\omega$ can be determined in the manner described below. Accordingly, assuming these values for a particular platform and connecting line configuration of interest to be known, the above equations (12) and (13) provide one method for determining the gain or scale factors $K_1$, $K_2$ which can then be used in the position equations (2), (3) to determine the horizontal position of the platform relative to the ocean floor reference.

If the physical characteristics of the connecting line are such that the simplifying assumptions used in the preceding development are not applicable, the gain or scale factors $K_1$, $K_2$ can be determined empirically with the aid of an appropriate computer simulation procedure. Such a simulation procedure is described in ASME Publication #77-PET-39 reporting a presentation made at the Energy Technology Conference and Exhibit, Houston, Texas, Sept. 18-22, 1977. This simulation is based on and uses essentially the same equations as an earlier Mohole riser study reported in NESCO (National Engineering Science Co) Report #183-2A dated January 1965 and entitled "Dynamic Stress Analyses of the Mohole Riser System." While the ASME publication discusses the simulation in the context of a marine riser such as shown in FIG. 6 of the drawings, it will be obvious to those versed in the art that the simulation covers other forms of connecting lines, such as the cable in FIGS. 1-5.

The procedure for determining the gain or scale factors $K_1$, $K_2$ using the connecting line simulation of the ASME publication involves the following steps:

1. Determine for the floating platform and connecting line of interest the critical physical characteristics involved in the ASME simulation.

2. Define for the environment conditions involved in the ASME simulation the worst case values which are anticipated to be encountered.

3. Define the ranges of tension, mud weight (if appropriate) and water depth for the application of interest.

4. Use the data obtained in steps 1, 2 and 3 as input to the ASME connecting line simulation to generate the time histories of the motion of the upper connecting line end and of the top and bottom connecting line slope angles for particular input parameter combinations of interest.

5. For each case simulated in step 4, select a number of sets, preferably three, of gain factors $K_1$, $K_2$ and combine these factor sets and associated slope angle time histories from step 4 in accordance with the position equations (2), (3) to obtain, for each selected gain factor set, the time history of the estimated horizontal position of the upper connecting line and relative to the lower end, e.g.:

$$x \text{ est } (t) = K_1 a_x(t)_T + K_2 a_x(t)_B \quad (14)$$

$$y \text{ est } (t) = K_1 a_y(t)_T + K_2 a_y(t)_B \quad (15)$$

where:
x est (t) = the time history of the x coordinate of the upper connecting line end;
$a_x(t)_T$ = the time history of the top connecting line slope angle in the x-z plane;
$a_x(t)_B$ = the time history of the bottom connecting line slope angle in the x-z plane;
y est (t) = the time history of the y coordinate of the upper connecting line end;
$a_y(t)_T$ = the time history of the top connecting line slope angle in the y-z plane;
$a_y(t)_B$ = the time history of the bottom connecting line slope angle in the y-z plane;

6. Use the Fourier transform to obtain amplitude and phase plots for the estimated top connecting line end position time histories obtained in step 5 for each selected gain factor set $K_1$, $K_2$, and amplitude and phase plots for the associated top connecting line end position time histories obtained in step 4 by the ASME simulation procedure.

7. Select the gain factors $K_1$, $K_2$ which yield estimated top connecting line end time histories having the preferred amplitude and phase characteristics relative to the simulation generated position time histories obtained in step 4.

In this latter regard, the gain factors $K_1$, $K_2$ are preferably selected such that the estimated horizontal position of the top connecting line end relative to the bottom end has the following characteristics:

(1) The difference in magnitude between the actual and estimated positions of the connecting line ends is preferably less than 1% of water depth for forcing functions, i.e., surface waves, with periods of 100 seconds and greater.

(2) The phase of the estimated upper connecting line end position preferably leads that of the actual position by a small amount. In a worst case condition, the estimated position must not lag the actual position by more than 5°.

The procedure defined by the foregoing steps 1-4 yields sets of corresponding values for the gain factors $K_1$, $K_2$ for the various parameter combinations of interest selected in step 4 for computer simulation.

Two different techniques have thus been explained for obtaining the gain factors $K_1$, $K_2$ for use in the platform position equations (2), (3). One of these techniques is represented by equations (12), (13) and involves solution of these equations for particular values of $\beta$, $\omega$, $\tau$ which may be determined in the manner discussed below. The other technique is represented by the combined position simulation/estimation procedure defined by the foregoing steps 1-7 and yields a series of optimum gain factor values corresponding to different environmental, platform and connecting line parameters of interest.

According to the present invention, the gain factor determination means 92 may be a computer for solving the gain factor equations (12), (13). In this case, the operator keyboard 46 may have means for selectively presetting into the computer 92 input data representing the values of $\beta$, $\omega$, $\tau$ for selected platform/connecting line system and sea spectrum involved. The computer 92 will be programmed to operate on this data in accordance with the equations (12), (13) and to input to the connecting line angle input channel multipliers 96 the corresponding factor values $K_1$, $K_2$ respectively.

Alternatively, the gain factor determination means 92 may comprise a memory in which are stored the various gain factors obtained by the ASME simulation/estimation procedure described earlier and from which the gain factors corresponding to any selected parameter combination used in step 4 of the procedure may be read out in the form of corresponding gain factor signals by inputting to the memory data representing the selected parameter combination. In this case, the operator keyboard 46 will include means of selectivity inputting such parameter data to the memory. Thus, in system operation, the keyboard operator will actuate the keyboard to input to or address the memory 92 with parameter data corresponding to the current ocean and/or other environmental conditions of interest. The memory will respond to this input data by reading out the corresponding gain factors $K_1$, $K_2$ to the slope angle input channel multipliers 96.

Following is a table of representative gain factors for a drill string/riser combination through which drilling mud is circulated during the drilling operation.

| Representative $K_1$ and $K_2$ Table | | | | |
|---|---|---|---|---|
| Water Depth(D) (Feet) | Mud Weight (lbs/gal) | Tension (1000 lbs) | $K_1/D$ | $K_2/D$ |
| 4500 | 20 | 650 | .857 | .143 |
| 4500 | 20 | 800 | .79 | .21 |
| 4500 | 20 | 950 | .750 | .250 |

It will now be understood that during operation of the platform position determining system of the invention, the top and bottom slope and azimuth angles of the connecting line 20, 20a are measured and converted, in the slope angle computers 94, to signals representing the top and bottom connecting line slope angles $(\alpha_x)_{TOP}$, $(\alpha_y)_{TOP}$, $(\alpha_x)_{BOTTOM}$, $(\alpha_y)_{BOTTOM}$, used in the platform position equations (2), (3). These latter slope angles are fed to the slope angle input channel multipliers 96 along with signals from the gain factor determining means 92 representing the gain factors $K_1$, $K_2$ corresponding to the current system parameter input data from the keyboard 46. The multipliers 96 obtain and output to the low pass channel filters 98 signals representing the products $K_1(\alpha_x)_{TOP}$, $K_2(\alpha_x)_{BOTTOM}$, $K_1(\alpha_y)_{TOP}$, $K_2(\alpha_y)_{BOTTOM}$.

Filters 98 are tuned to filter out higher order frequencies present in the product signals from the multipliers 96 resulting from wave induced motion of the platform 10, 10a which does not result in any net change in the platform position. Typically, these filters have a high side-cut-off frequency on the order of $\frac{1}{4}$ cycles per second. Accordingly, the filtered output signals from the channel filters 98 are effectively the products of the gain factors $K_1$, $K_2$ and the mean top and bottom connecting line slope angles, i.e. the top and bottom slope angles of the envelope of the undulating connecting line configuration produced by the wave motion.

The filtered product signals from the filters 98 are fed to the estimator 100 which adds the products in accordance with the position equations (2), (3) and outputs signals representing the corresponding X and Y coordinates of the platform. The coordinate signals from the estimator 100 may be further filtered by the filter 102 to further suppress high frequency forcing functions, such as wave action, which create no net change in the platform position.

As mentioned, equations (12), (13) may be used to determine the platform position if the quantities $\beta$, $\omega$, $\tau$ are known. These quantities may be determined for a given platform connecting line system and sea spectrum of interest as follows. The phase angle $\beta$ may be determined by using the earlier mentioned simulation procedure to generate the time histories of the platform motion and upper connecting line slope angle and from these time histories determining the phase angle ($\beta$) of the upper slope angle relative to the platform motion. The quantity $\tau$ is determined by dividing the connecting line length by the square root of the ratio of the connecting line mass per unit length to the connecting line tension. The quantity $\omega$ may be determined by solving the equations (12), (13) for the scale factors $K_1$, $K_2$ for a range of $\omega$ values using the $\beta$ and $\tau$ values determined as above for the particular platform/connecting line system and sea spectrum of interest and selecting the $\omega$ value which yields scale factors equalling or most closely approximating the scale factors obtained by the earlier described simulation/estimation procedure based on the same platform/connecting line system and sea spectrum. By way of example, it was found that for one simulated platform/connecting line system and sea spectrum, the phase angle $\beta$ remained nearly constant at 30° over a wide range of water depths and connecting line tensions for a range of wave periods from 100 seconds to 400 seconds. In this simulation, an $\omega$ value of 0.0628 provided good correlation between the scale factor values obtained by computation using equations (12), (13) and the scale factors obtained by computed simulation.

As mentioned earlier and shown in the drawings, the platform position signals from the estimator 100 are fed to the platform positioning system 18. This positioning system may comprise any suitable positioning system, such as that described in U.S. Pat. No. 3,730,126 for propelling the platform 10 to maintain the latter in a desired horizontal position relative to the ocean floor Reference P.

We claim:

1. A system for determining the relative horizontal positions of the upper and lower ends of a flexible connecting line suspended from a floating marine platform, and wherein the length of said line is many orders of magnitude greater than the relative horizontal displacement of the connecting line ends, said system comprising:

angle sensing means including upper and lower connecting line angle sensors for producing angle signals representing the vertical slope angles and azimuth angles of the upper and lower ends of said connecting line, signal processing means for combining said angle signals in accordance with a predetermined relationship of said slope angles which compensates for phase difference between the sensor outputs due to the propagation time of stress waves through said line to provide an output signal representing said relative horizontal positions, and a positioning system adapted to correct said relative horizontal displacement of said platform in response to said output signal.

2. A system for determining the relative horizontal positions in terms of a cartesian coordinate system having a vertical Z axis and horizontal X and Y axes of the upper and lower ends of a flexible connecting line suspended from a floating marine platform, comprising:

angle sensing means including upper and lower connecting line angle sensors for producing angle signals representing the vertical slope angles of the upper and lower ends of said connecting line measured in vertical X planes parallel to said X and Z axes and vertical Y planes parallel to said X and Z axes and vertical Y planes parallel to said Y and Z axes, signal processing means for combining said angle signals in accordance with the following equations (1) and (2) to provide an output signal representing the relative horizontal positions of said connecting line ends in terms of the X and Y coordinates of the upper end relative to the lower end $$X = K_1(\alpha_x)_{TOP} + K_2(\alpha_x)_{BOTTOM}$$

$$Y = K_1(\alpha_y)_{TOP} + K_2(\alpha_y)_{BOTTOM}$$

where:

$(\alpha_x)_{TOP}$, $(\alpha_x)_{BOTTOM}$ are the upper and lower vertical slope angles of the connecting line measured in said X planes, respectively, $(\alpha_y)_{TOP}$, $(\alpha_y)_{BOTTOM}$ are the upper and lower vertical slope angles of the connecting line measured in said Y planes, respectively, $K_1$, $K_2$ are scale factors which are dependent upon at least some of the following: surface wave spectrum; physical characteristics of the connecting line including tension, modulus of elasticity, moment of inertia, drilling mud weight if used, and transit time of platform motion induced stress waves through the connecting line; physical characteristics of the platform; water current, and a positioning system adapted to correct said relative horizontal displacement of said platform in response to said output signal.

3. The system of claim 2 wherein:

said scale factors equal:

$$K_1 = D \left[ \frac{1}{1 + \frac{T_B \cos \beta}{T_T \sin \omega \tau}} \right]$$

$$K_2 = D \left[ \frac{\frac{T_B \cos \beta}{T_T \sin \omega \tau}}{1 + \frac{T_B \cos \beta}{T_T \sin \omega \tau}} \right]$$

where:

D = water depth;
$T_B$ = bottom connecting line tension;
$T_T$ = top connecting line tension;
$\delta$ = time phase angle of the top connecting line slope angle with respect to the platform velocity;
$\omega$ = angular frequency of platform oscillatory motion;
$\tau$ = propagation time of stress waves through line.

4. The system of claim 2 wherein:

said scale factors are determined for a given platform/connecting line system and marine conditions of interest by comparing estimated platform X and Y coordinates obtained by solution of said equations (1) and (2) using arbitrary scale factor values with simulated platform X and Y coordinates obtained by computer simulation of the response of said platform/connecting line system to said marine conditions, and selecting the numerical scale factor values which yield the best correlation between the estimated and simulated coordinates.

5. The system of claim 1 wherein:

said signal processing means includes low pass filter means for attenuating higher signal frequencies resulting from wave induced motion of said platform.

6. The system of claim 2 wherein:

said signal processing means comprises means for providing scale factor signals representing selected scale factor values, means for receiving said angle and scale factor signals and producing product signals representing the products of the corresponding slope angles and scale factors according to said equations (1), (2), means for summing said product signals according to said equations (1), (2) and producing said output signal representing said X, Y coordinates, and low pass filter means for attenuating higher order frequency components present in said signals due to wave induced platform motion.

7. A method of determining the relative horizontal positions of the upper and lower ends of a flexible connecting line suspended from a floating marine platform, and wherein the length of said line is many orders of magnitude greater than the relative horizontal displacement of the connecting line ends, said system, comprising:

sensing and producing angle signals representing the vertical slope angles and azimuth angles of the upper and lower ends of said connecting line, combining said angle signals in accordance with a predetermined relationship of said slope angles which compensates for phase difference between the sensor outputs due to the propagation time of stress waves through said line to provide an output signal representing said relative horizontal positions, and supplying said output signal to a positioning system adapted to correct said relative horizontal displacement of said platform.

8. The method of determining the relative horizontal positions in terms of a cartesian coordinate system having a vertical Z axis and horizontal X and Y axes of the upper and lower ends of a flexible connecting line suspended from a floating marine platform comprising:

sensing and producing angle signals representing the vertical slope angles of the upper and lower ends of said connecting line measured in vertical X planes parallel to said X and Z axes and vertical Y planes parallel to said Y and Z axes, combining said angle signals in accordance with the following equations (1) and (2) to provide an output signal representing the relative horizontal positions of said connecting line ends in terms of the X and Y coordinates of the upper end relative to the lower end $$X = K_1(\alpha_x)_{TOP} + K_2(\alpha_x)_{BOTTOM}$$

$$Y = K_1(\alpha_y)_{TOP} + K_2(\alpha_y)_{BOTTOM}$$

where:

$(\alpha_x)_{TOP}$, $(\alpha_x)_{BOTTOM}$ are the upper and lower vertical slope angles of the connecting line measured in said X planes, respectively, $(\alpha_y)_{TOP}$, $(\alpha_y)_{BOTTOM}$ are the upper and lower vertical slope angles of the connecting line measured in said Y planes, respectively, $K_1$, $K_2$ are scale factors which are dependent upon at least some of the following: surface wave spectrum; physical characteristics of the connecting line including tension, modulus of elasticity, moment of inertia, drilling mud weight if used, and transit time of platform motion induced stress waves through the connecting line; physical characteristics of the platform; water current, and supplying said output signal to a positioning system adapted to correct said relative horizontal displacement of said platform.

9. The method of claim 8 wherein:
said scale factors equal:

$$K_1 = D \left[ \frac{1}{1 + \frac{T_B \cos \beta}{T_T \sin \omega \tau}} \right]$$

$$K_2 = D \left[ \frac{\frac{T_B \cos \beta}{T_T \sin \omega \tau}}{1 + \frac{T_B \cos \beta}{T_T \sin \omega \tau}} \right]$$

where:

D = water depth;
$T_B$ = bottom connecting line tension;
$T_T$ = top connecting line tension;
$\beta$ = time phase angle of the top connecting line slope angle with respect to the platform velocity;
$\omega$ = angular frequency of platform oscillatory motion;
$\tau$ = propagation time of stress waves through line.

10. The method of claim 8 wherein:
said scale factors are determined for a given platform/connecting line system and marine conditions of interest by comparing estimated platform X and Y coordinates obtained by solution of said equations (1) and (2) using arbitrary scale factor values with simulated platform X and Y coordinates obtained by computer simulation of the response of said platform/connecting line system to said marine conditions, and selecting the numerical scale factor values which yield the best correlation between the estimated and simulated coordinates.

11. The method of claim 8 wherein:
filtering said signals to attenuate higher signal frequencies resulting from wave induced motion of said platform.

12. The method of claim 8 wherein:
said signal combining step comprises providing scale factor signals representing selected scale factor values, producing product signals representing the products of the corresponding slope angles and scale factors according to said equations (1), (2), summing said product signals according to said equations (1), (2) and producing said output signal representing said X, Y coordinates, and filtering said signals to attenuate higher order frequency components present in said signals due to wave induced platform motion.

13. A system of positioning a floating marine platform relative to a reference position on the ocean floor comprising:

a flexible connecting line extending between said platform and reference position, angle sensing means including upper and lower connecting line angle sensors for sensing and producing angle signals representing the vertical slope angles and azimuth angles of the upper and lower ends of said connecting line, signal processing means for combining said signals in accordance with a predetermined relationship and producing an output signal representing the horizontal position of said platform relative to said reference position, and means for horizontally positioning said platform in response to said signal.

14. A method of positioning a floating marine platform relative to a reference position on the ocean floor comprising:

sensing and producing angle signals representing the vertical slope angles and azimuth angles of the upper and lower ends of a flexible connecting line extending between said platform and reference position, combining said signals in accordance with a predetermined relationship and producing an output signal representing the horizontal position of said platform relative to said reference position, and horizontally positioning said platform in response to said signal.

15. A signal processing system adapted to determine the relative horizontal displacement of a floating marine platform from a predetermined point, said system being adapted to receive input signals representing the vertical slope angles and azimuth angles of the upper and lower ends of a flexible connecting line suspended from a floating marine platform, said system comprising:

a first analog-to-digital converter means for receiving, combining, and converting an upper angle signal to provide a converted upper angle signal, a d.c. power supply means for providing a calibration signal;

a timing and control logic means for providing first, second, and third timing and control signals respectively;

an analog multiplexer means for receiving and combining said calibration signal, said first timing and control signal, and a lower angle signal to provide a composite signal;

a second analog-to-digital converter means for receiving and combining said composite signal and said second timing and control signal to provide a converted lower angle signal; a modem means for receiving and combining said converted lower angle signal and said third timing and control signal to provide a digital information signal;

a conditioning means for receiving and conditioning said converted upper angle signal and said digital information signal to provide a conditioned data signal and a data ready signal, respectively, to said signal processing means;

a keyboard means for entry of cable, platform, and marine parameters to provide a system parameter signal to said signal processing means;

said processing means providing an output signal to said positioning system and a read out signal to a digital read out.

16. The system of claim 15, in which said digital read-out displays the coordinates of said platform.

17. The system of claim 15, in which said digital read-out displays said cable, platform, and marine parameters.

18. The system of claim 15, in which said modem means includes an up link modulater and cable driver means for providing an up link signal to a demodulator means which provides said digital information signal.

* * * * *

UNITED STATES PATENT AND TRADEMARK OFFICE
CERTIFICATE OF CORRECTION

PATENT NO. : 4,205,379
DATED : May 27, 1980
INVENTOR(S) : Marvin Fox et al.

It is certified that error appears in the above-identified patent and that said Letters Patent are hereby corrected as shown below:

Column 7, line 24 "(20)" should be cancelled and --(2)-- substituted therefor;

line 31 "if" should be cancelled and --is-- substituted therefor;

Column 13, line 38 "τrepresenting" should be cancelled and --τ representing-- substituted therefor; and Column 15, line 23 "1-4" should be cancelled and --1-7-- substituted therefor.

Signed and Sealed this

Second Day of December 1980

[SEAL]

Attest:

SIDNEY A. DIAMOND

Attesting Officer

Commissioner of Patents and Trademarks